United States Patent Office 3,403,749
Patented Oct. 1, 1968

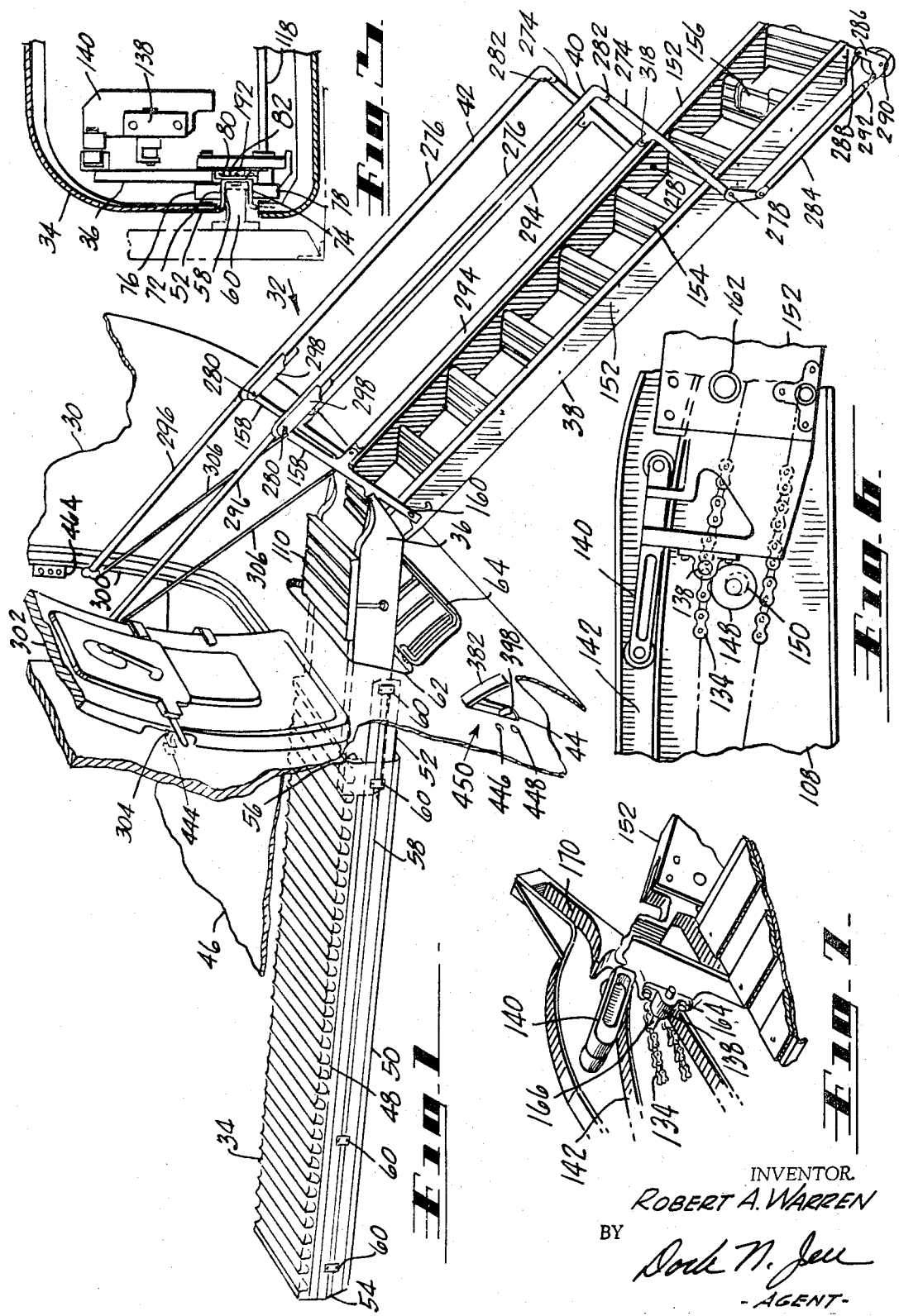

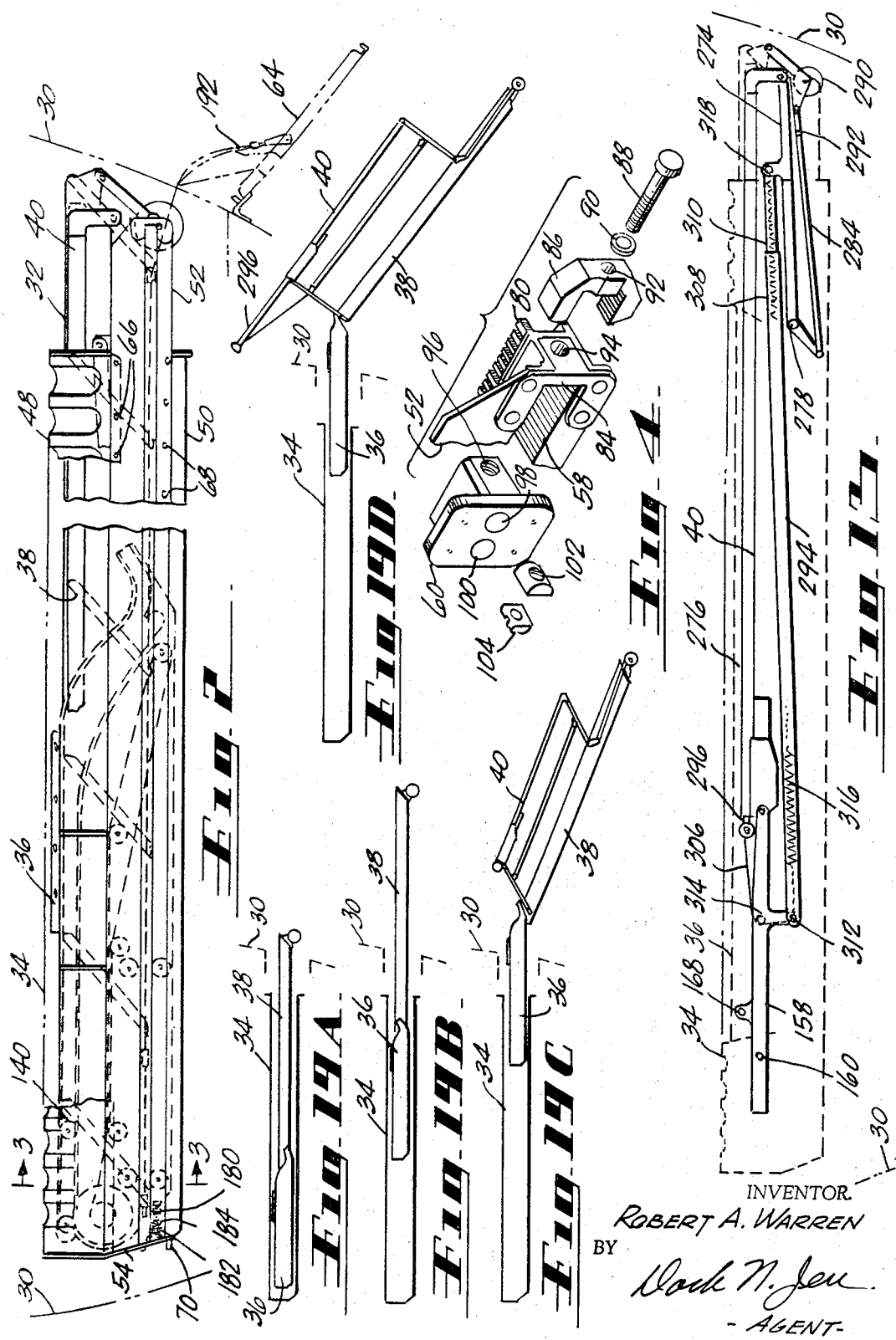

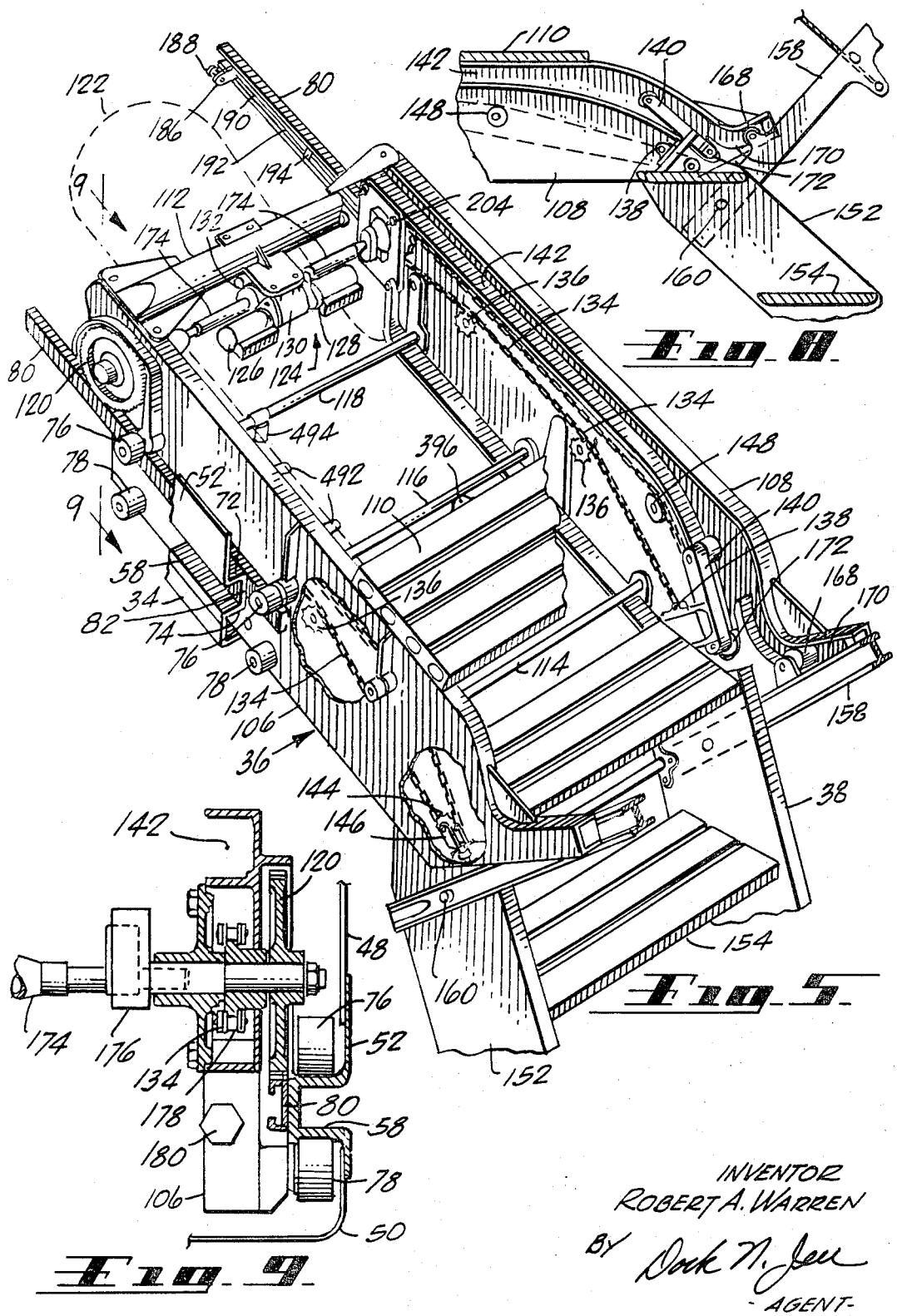

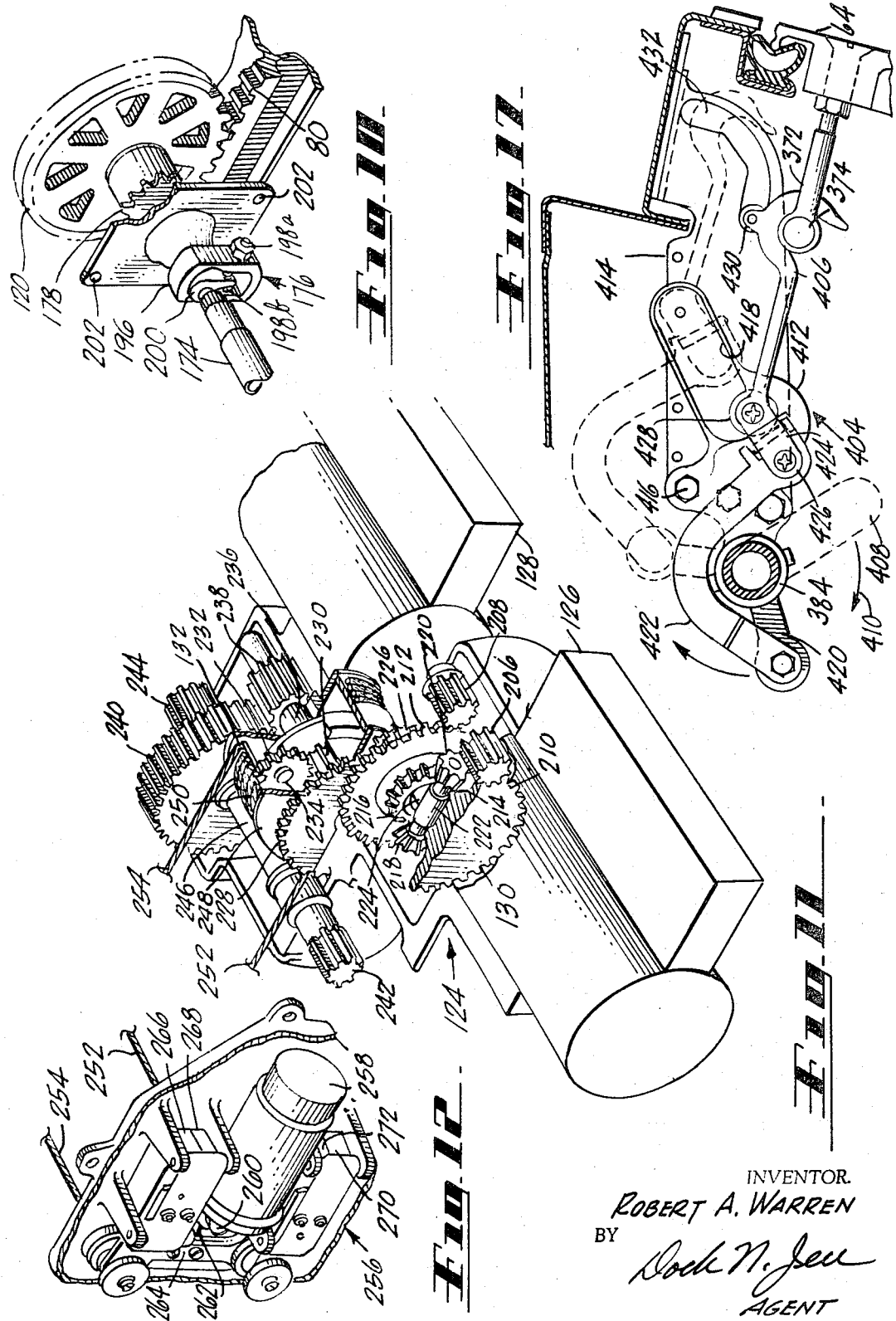

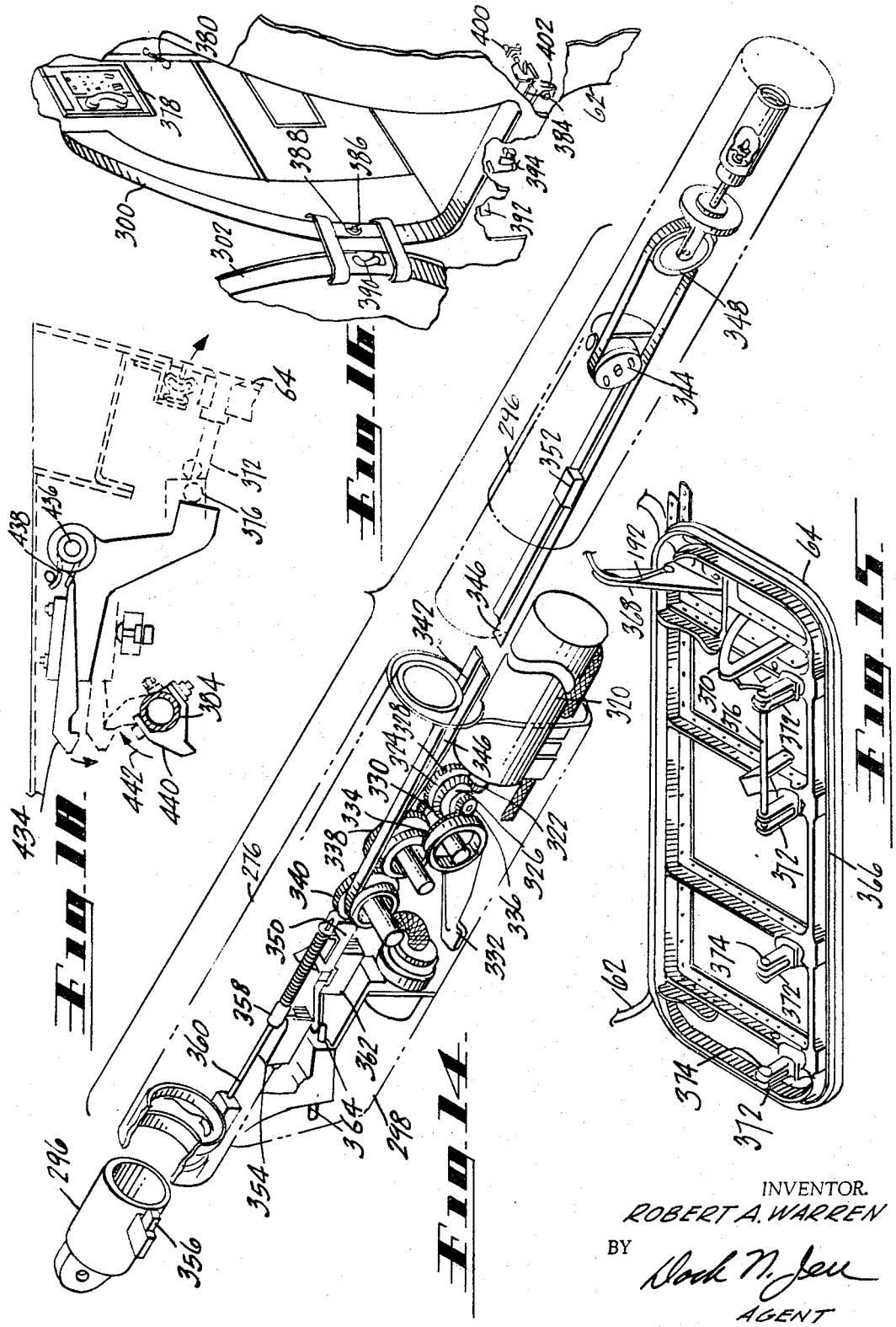

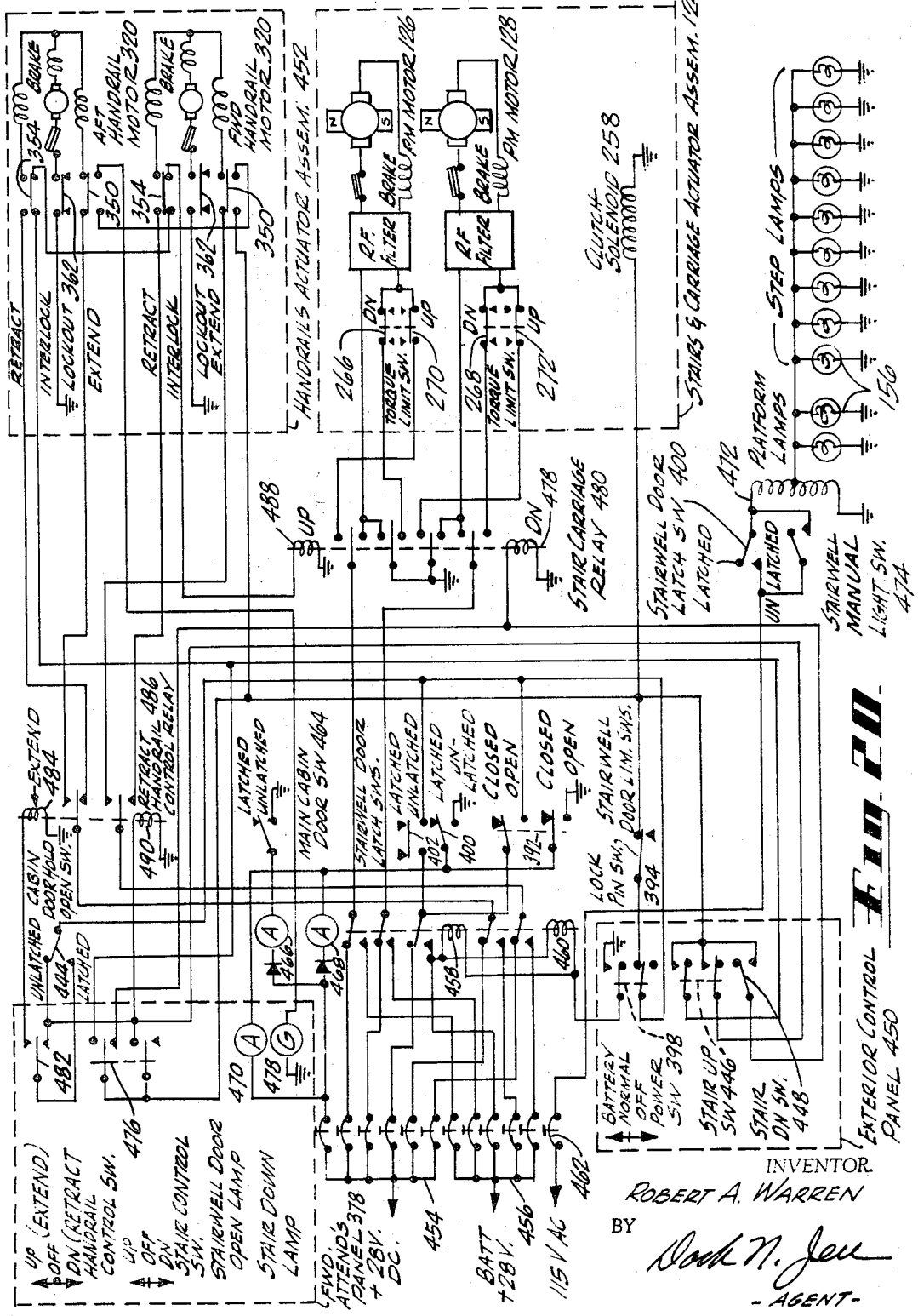

3,403,749
AIRCRAFT STAIRWAY ASSEMBLY
Robert A. Warren, Long Beach, Calif., assignor, by mesne assignments, to McDonnell Douglas Corporation, Santa Monica, Calif., a corporation of Maryland
Filed Sept. 15, 1966, Ser. No. 579,745
9 Claims. (Cl. 182—88)

ABSTRACT OF THE DISCLOSURE

Aircraft stairway assembly including a pair of tracks provided within a stairwell positioned in an aircraft beneath a doorway, the aircraft mounting a stairwell door for closing the stairwell, a carriage adapted to be driven on the tracks between first and second positions thereon, and a stair assembly connected to and moved by the carriage, the stair assembly having a foldable set of handrails and is placed in a folded, raised and retracted condition in the stairwell when the carriage is at its first position and in an extended, lowered and unfolded condition when the carriage is at its second position.

---

My present invention relates generally to stairway assemblies and more particularly to an aircraft stairway assembly which is normally installed and carried on an airplane for its regular use.

In the past, the majority of the larger passenger carrying transports did not carry its own stairway assembly to enplane and deplane passengers. Movable ramps or stairs were, of course, usually provided at the air terminals for this purpose. These ramps and stairs were moved into place against the airplanes and away therefrom, as required, by the ground crew. However, it was necessary that movable ramps and stairs of matching heights be provided for the various sizes of aircraft.

In some of the more modern and larger airports, the buildings were designed so that the airplanes could be parked adjacent to a depot lounge building and passengers therein would enplane through elevated passageways connecting certain building areas with their respectively adjacent airplanes. Passengers from incoming airplanes would, of course, deplane through these same passageways into the building. In these airports, it is unnecessary for the aircraft to carry its own stairway assembly.

Where it was infeasible to bring the aircraft reasonably close to any of the movable ramps and stairs, or the depot building of an airport, mobile lounge vehicles have been employed to shuttle passengers between the airplanes and the depot building. These vehicles normally have an exceptionally high floor from (or to) which the passengers can move readily onto (or from) the aircraft floor that is of an approximately similar height. Such mobile lounge vehicles are, however, usually found only on a relatively few of the larger airports.

With the advent of the medium and smaller transports which connect with an increasingly large number of small cities having relatively little airport facilities and accommodations for enplaning and deplaning passengers, it soon became apparent that it was necessary for these transports to carry and provide their own stairway assemblies. These stairway assemblies must, however, meet many requirements in order to be useful and effective.

The majority of the medium and smaller transports do carry their own stairway assemblies. However, the stairway assemblies provided on many of these transports are stowed directly in or before the cabin doorway within the aircraft and normally must be set up or deployed in order to establish a clear passageway through the cabin doorway. Modern jetway compatibility is not achieved with such aircraft stairway assemblies at modern air terminals where suitable ramps, stairs, elevated connecting passageways or mobile lounge vehicles may be readily available and preferably used with all transports.

It is a major object of my invention to provide an aircraft stairway assembly which can be easily installed and carried on an airplane for compatible use at all locations under widely differing conditions and environments that may be encountered by the airplane.

Another object of the invention is to provide an aircraft stairway assembly which is a self-contained unit that is simple to operate from either an interior or an exterior control panel of the airplane.

A further object of the invention is to provide an aircraft stairway assembly which is normally and reliably operated fully on power but is capable of direct manual operation in the event of power failure.

A still further object of this invention is to provide an aircraft stairway assembly which is structurally strong, light in weight, and can be compactly stowed away in a very small space in the airplane.

Other objects and features of my invention will become apparent, and the advantages thereof will be made clear, from the following detailed description of an exemplary embodiment of the invention. The description is to be taken in conjunction with the accompanying drawings, in which:

FIGURE 1 is a perspective view showing an aircraft stairway assembly in accordance with this invention installed and in use on an airplane;

FIGURE 2 is a side elevational view of a stairway housing assembly or container as installed on an airplane and including the stairway assembly withdrawn into the housing;

FIGURE 3 is a fragmentary view of the stairway assembly as taken along the line 3—3 indicated in FIGURE 2;

FIGURE 4 is a fragmentary exploded view showing a method of securing end portions of the stairway housing to connectors attached to aircraft structure;

FIGURE 5 is a perspective view of the carriage assembly of the stairway assembly;

FIGURE 6 is a fragmentary view of a side plate of the carriage assembly showing a stair cam follower operating on a cam track of the side plate;

FIGURE 7 is a perspective view which is generally similar to the view of FIGURE 6, showing the stair cam follower moved to one end of the cam track of the side plate;

FIGURE 8 is a view showing a handrail post and its cam follower located in the upper split end of the cam track of a side plate of the carriage assembly;

FIGURE 9 is a fragmentary sectional view of the carriage assembly as taken along the line 9—9 indicated in FIGURE 5;

FIGURE 10 is a perspective view of an adjustable coupling means which connects an output shaft from the carriage actuator assembly to a chain drive sprocket and a carriage drive gear;

FIGURE 11 is a perspective view of the actuator assembly which is mounted to the carriage assembly;

FIGURE 12 is a perspective view of the control mechanism for the actuator assembly;

FIGURE 13 is a side elevational view showing the folded arrangement of a handrail assembly when the stairway assembly is drawn into its housing;

FIGURE 14 is a perspective view of the handrail actuator assembly for actuating the extendable and retractable section of the handrail assembly;

FIGURE 15 is a perspective view of the inside structure of the stairwell door which is hingedly mounted to an airplane fuselage;

FIGURE 16 is a fragmentary perspective view of an airplane fuselage showing the cabin doorway and certain control elements for the aircraft stairway assembly;

FIGURE 17 is a side elevational view of the latch mechanism which may be used with the stairwell door;

FIGURE 18 is a side elevational view of the hold-open mechanism for the stairwell door latch mechanism;

FIGURES 19A, 19B, 19C and 19D are simplified, diagrammatic drawings illustrating the progressive lowering of the aircraft stairway assembly; and FIGURE 20 is a circuit diagram for the aircraft stairway assembly.

FIGURE 1 is a fragmentary perspective view of an airplane 30, looking aft, carrying an aircraft stairway assembly 32 which is constructed in accordance with my invention. The stairway assembly 32 is shown here in its down, extended position. Generally, the stairway assembly 32 comprises a stairway housing assembly or container 34, a carriage assembly 36, a stair assembly or step portion 38, handrail assemblies 40 and 42, and an electrical system 44.

The housing assembly 34 is a container in which the main part of the stairway assembly 32 is housed when the stairway assembly 32 is in its retracted, up position. The housing assembly 34, or more simply housing 34, is a relatively long, rectangular tube which is mounted laterally beneath the floor 46 of the airplane 30 as indicated in FIGURE 1. The housing 34 includes an upper corrugated cover 48 and a lower pan 50 which are secured together through a channel track member 52 on each side to form a tube that has a closed end 54 and an open end 56. The channel track member 52 on each side of the housing 34 has a channel 58 which engage four T fittings 60 attached to aircraft structure adjacent to each side of the housing 34. Thus, the channels 58 on their respective sides of the housing 34 allow the same to be slipped into the airplane 30 through stairwell doorway 62 with the stairwell door 64 opened, of course.

FIGURE 2 is a side elevational view, looking aft, of the housing 34 installed in the airplane 30 and having the stairway assembly 32 in its retracted, upon condition wherein the movable parts thereof are largely positioned within the housing 34. The stairwell door 64 is then actually closed from its open position indicated in phantom lines and latched to be flush with the fuselage of the airplane 30. The cover 48 is secured on each side to a track member 52 by screws 66 and the pan 50 is similarly secured to the track member 52 by screws 68. The screws 66 and 68 have been omitted from the portion left of the break in FIGURE 2 for clarity of illustration.

The left end in FIGURE 2 of the cover 48 extends low enough to be overlapped by the corresponding end of the pan 50 so that the overlapping portions may be secured together by screws such as the screws 68. This, of course, forms the closed end 54 of the housing 34. A drain connection 70 to the housing 34 is provided for connection to a drainage system to discharge overboard any fluids from rain, snow, etc., which were caught and collected in the housing 34. It can be seen from FIGURE 2 that the carriage assembly 36 has been moved fully to the left in the housing 34, the handrail assemblies 40 and 42 retracted and folded against the stair assembly 38, and the latter combination raised and drawn back between the carriage assembly 36 into the housing 34.

FIGURE 3 is a fragmentary cross sectional view as taken along the line 3—3 indicated in FIGURE 2. Aircraft structure, including the T fittings 60 which are attached thereto, is shown in phantom lines. The four fittings 60 spaced along each side of the housing 34 engage channel 58 of the track member 52. The track member 52 on each side of the housing 34 has upper and lower races 72 and 74 on which ride rollers 76 and 78, respectively, rotatably mounted to the carriage assembly 36. A gear rack 80 is attached to the end wall 82 of channel 58 on each of the track members 52.

FIGURE 4 is an exploded, perspective view illustrating the manner in which the housing 34 can be secured in place after installation thereof in the airplane 30. The last T fitting 60 nearest the stairwell doorway 62 is located adjacent to a guide bracket 84 which is suitably affixed to the end of channel 58 of the track member 52. Stop member 86 straddles the end of the track member 52 and a bolt 88 is passed through washer 90, hole 92 in stop member 86, hole 94 in the guide bracket 84 and into a longitudinal hole 96 in the T fitting 60.

Two laterally extending holes 98 and 100 which intersect at right angle with the longitudinally extending hole 96 are also provided in the T fitting 60 as shown in FIGURE 4. A barrel nut 102 and retainer 104 are placed respectively in the holes 98 and 100, and are engaged by the threaded end of the bolt 88. Thus, roller stops are provided at the ends of the upper and lower races 72 and 74 for the track member 52 on each side of the housing 34. The other T fittings 60, of course, do not require any of the holes 96, 98 or 100 since those fittings need not accommodate a bolt such as bolt 88.

FIGURE 5 is a perspective view of the carriage assembly 36, including fragmentary portions of the stairway housing 34 and stair assembly 38. The carriage assembly 36 includes two machined side plates 106 and 108 which are bridged and connected by a top platform 110 and a stairs and carriage actuator support tube 112. The lower part of the side plates 106 and 108 are separated and connected by three spacer tubes 114, 116 and 118.

The upper rollers 76 engage the upper race 72 and the lower rollers 78 engage the lower race 74 of the track member 52. Gear rack 80 is attached to the end wall 82 of channel 58 on the track member 52. The other gear rack 80 is similarly attached to the end wall 82 on the other track member 52 which is not indicated in the view of FIGURE 5. The left (forward) gear rack 80 is engaged by gear 120 which is driven by a stairs and carriage actuator assembly 124 that is mounted to the support tube 112. The right (aft) gear rack 80 is, of course, engaged by another gear 120 (not visible in this figure) which is similar to the visible gear 120. Thus, the carriage assembly 36 may be propelled on the rollers 76 and 78 within the housing 34 by the drive gears 120 moving on gear racks 80.

Electrical power to the carriage assembly 36 is supplied through cable 122 which is partially fastened to the bottom of pan 50 by brackets 492. The cable 122 is led out the open end 56 (FIGURE 1) of the housing 34 and secured to aircraft structure to connect with the electrical system of the aircraft. The portion of the cable 122 between the last bracket 492 and the carriage assembly 36 rests in a loop on the bottom of pan 50. As the carriage assembly is moved backwards, a vertical roller 494 secured to spacer tube 118 engages the side of the cable 122 to keep it from becoming entangled.

The actuator assembly 124 generally includes two direct current motors 126 and 128, a differential gearing drive 130, and a sun and planetary clutch device 132. The differential drive 130 allows the actuator assembly 124 to operate at half speed if either of the motors 126 or 128 malfunctions. The clutch device 132 permits manual operation of the stairway assembly 32 from the ground when direct current power is removed from the actuator assembly 124. In addition to driving the gears 120, the actuator assembly 124 also drives two closed loop chains 134 supported by sprockets 136 mounted to the side plates 106 and 108. These chains 134 each has a link which is connected to a fitting 138 attached to a cam follower 140 secured to the end of a side of stair assembly 38.

Each cam follower 140 moves along a cam track 142 and the chains 134 produce motion between the stair assembly 38 and the carriage assembly 36 in direct proportion to the motion between the carriage assembly 36 and the stairway housing 34. An end sprocket 144 is mounted to a clevis 146 which is attached to end structure of each of the side plates 106 and 108. A roller 148 which is adjustable in height is also mounted on each of the side plates 106 and 108 to support further the chains 134.

FIGURE 6 is a fragmentary view of the side plate 108 having the roller 148 mounted thereto. The roller 148 is adjusted to a suitable height by an eccentric bushing 150 such that chain 136 will ride over the roller 148 without binding. The cam follower 140 is integrally secured to the upper end of a side beam 152 of the stair assembly 38. As can be seen from FIGURE 1, the side beams 152 mount nine steps or treads 154. Lamps 156 are provided on the under surface of each of the treads 154 and also under the platform 110. The posts 158 of the handrail assemblies 40 and 42 have been omitted from FIGURE 6 for clarity of illustration. A post 158 is pivotably secured to the beam 152 by a bolt 160 (FIGURES 1 and 5) through bushing 162 (FIGURE 6).

FIGURE 7 is a perspective view generally similar to the view in FIGURE 6, showing the cam follower 140 moved to the lower end of the cam track 142. This is similar to the condition shown in FIGURE 5. The fitting 138 is attached to the cam follower 140 by bolts 164, and link 166 having a projecting pin is connected thereby to the fitting 138 and suitably secured thereto. Thus, the stair assembly 38 is connected to both of the chains 134 and is moved with the movement of the chains 134. The posts 158 of the handrail assemblies 40 and 42 have also been omitted from FIGURE 7 for clarity of illustration.

FIGURE 8 is a view generally similar to that of FIGURE 7 showing, however, the post 158 having its cam follower 168 located in cooperation with an upper end 170 of the cam track 142 of the side plate 108. The cam tracks 142 of both side plates 106 and 108 are each split into an upper end 170 and a lower end 172 which the cam follower 140 follows at the end of the cam track 142. The positions of the cam followers 140 and 168 in the split ends 172 and 170, respectively, are also shown in the perspective view of FIGURE 5. The end 170 of the cam track 142 is contoured to raise and lower the post 158 rotatably on its pivot bolt 160.

FIGURE 9 is a fragmentary sectional view of the carriage assembly 36 as taken along the line 9—9 indicated in FIGURE 5. Output shaft 174 from the actuator assembly 124 is connected by an adjustable coupling means 176 to drive sprocket 178 and drive gear 120. The sprocket 178 engages the chain 134 and the gear 120 engages the gear rack 80. A stop bolt 180 is attached to the end of the side plate 106 of the carriage assembly 36. The bolt 180 engages the apex end of a conical compression spring coil 182 positioned concentrically about a shorter pedestal 184 at the end of the travel of the carriage assembly 36 as indicated in FIGURE 2. The spring coil 182 thus cushions the stoppage of the carriage assembly 36 which is then positively stopped by the pedestal 184.

The other side plate 108 of the carriage assembly 36 does not have a bolt attached thereto similar to the bolt 180. The end of the side plate 108 engages a slider 186 having a bolt 188 attached thereon as shown in FIGURE 5. The slider bolt 188 engages a conical compression spring coil positioned about a pedestal as does the stop bolt 180 at the end of the travel of the carriage assembly 36. The slider 186 slides freely within the channel 190 formed by the lower portion of the gear rack 80. The slider 186 protrudes laterally outwardly from the channel 190 so as to engage the end of the side plate 108.

A cable 192 connects with the slider 186 and runs along the channel 190, the cable 192 being supported along its length by suitably spaced, sliding support blocks 194 positioned in channel 190. The cable 192 is connected on its other end to the stairwell door 64 indicated in its open condition in phantom lines in FIGURE 2. Thus, the last approximate foot of travel of the carriage assembly 36 pulls the stairwell door 64 almost to a fully closed condition through the cable 192. The door 64 is fully closed by a latching mechanism which will be described later.

FIGURE 10 is a perspective view of the coupling means 176 which connects the output shaft 174 (torque tube) to the chain drive sprocket 178 and the drive gear 120. A fitting 196, which is integrally connected to the shaft mounting the sprocket 178 and gear 120, has two directly opposing set screws 198a and 198b threaded through the parallel sides of the fitting 196 into its hollow center to set against the end of a lever arm 200 which is affixed at the other end to the output shaft 174. By adjusting the two set screws 198a and 198b, the drive gear 120 (and sprocket 178) can be adjusted in its position a small amount on the gear rack 80.

From FIGURE 5, it can be seen that when the drive gear 120 is adjusted on rack 80 with respect to the relatively fixed output shaft 174, the effect is that the corresponding side of the carriage assembly 36 is moved with respect to the other, relatively fixed side thereof. By adjusting the angularity between the two drive gears 120, the carriage assembly 36 can be centered midway between the housing track members 52 on the races 72 and 74. The mounting flange of fitting 196 has oversized mounting holes 202, for example, as indicated in FIGURE 10, to permit adjustment of the drive gear 120 with respect to the rack 80 when suitable bolts 204 (FIGURE 5) are used to secure the fitting 196 to the relatively fixed carriage structure.

FIGURE 11 is an enlarged, broken-away, perspective view of the stairs and carriage actuator assembly 124. The direct current motors 126 and 128 have spring-loaded brakes which are released whenever the motors 126 and 128 are properly energized. These motors 126 and 128 have respective output pinion gears 206 and 208 which engage corresponding ring gears 210 and 212 of the differential gearing drive 130. The ring gears 210 and 212 have concentric bevel ring gears 214 and 216 respectively affixed thereto and these gears 214 and 216 mesh with two pinion bevel gears 218 and 220 rotatably mounted on the ends of a shaft 222.

Extending at right angles from the shaft 222 is an integral shaft 224 having a gear 226 secured thereon to drive another gear 228. A sun gear 230 is affixed to the same shaft as the gear 228 and drives three planetary gears 232 equally spaced about the sun gear 230. The planetary gears 232 are rotatably mounted on pins 234 which are positioned about a flange on the shaft 236 having a gear 238 affixed thereon. The gear 238 meshes with output gear 240 having drive gears 242 and 244 secured to the ends of the shaft 246 mounting the output gear 240. The drive gears 242 and 244 are suitably coupled to the output shafts 174 (FIGURES 5 and 10) which drive the gears 120 on the racks 80.

The planetary gears 232 mesh with the internal teeth on a drum 248 having several turns of a torque sensing cable 250 wrapped around it. The drum 248 is held stationary and prevented from rotating when tension is applied to the ends 252 and 254 of the cable 250. When the drum 248 is held stationary, the shaft 236 and gear 238 are rotated by rotation of the planetary gears 232 driven by the sun gear 230. The output gear 240 and, of course, the drive gears 242 and 244 are then driven to drive the carriage assembly 36. The drum 248 and its cable 250 comprise a clutch device which allows the carriage assembly 36 to be driven only when tension is applied to the ends 252 and 254 of the cable 250.

FIGURE 12 is a perspective view of the control mechanism 256 for the actuator assembly 124. This mechanism 256 is located directly before the clutch device 132 shown in FIGURE 11. The control mechanism 256 includes a solenoid 258 which has its output shaft 260 connected to a lever arm 262 that is pivoted to raise a rocker arm 264 at the latter's pivot point. When the solenoid 258 is energized, the rocker arm 264 is raised outwardly to place the cable 250 under tension by pulling on both cable ends 252 and 254. The rocker arm 264, however, is still capable of being rocked on its pivot point.

Torque limit switches 266 and 268 are actuated (opened) when the rocker arm 264 is pivoted (rocked) in one direction, and the torque limit switches 270 and 272 are actuated (opened) when the rocker arm 264 is pivoted in the other direction. When the load presented to the output gear 240 (FIGURE 11) is high enough to cause the planetary gears 232 to rotate the drum 248, the cable 250 will cause the rocker arm 264 to pivot in one direction or the other, according to the direction of rotation of the motors 126 and 128, sufficiently to actuate either the limit switches 266 and 268 or the limit switches 270 and 272. This action breaks the circuit to the motors 126 and 128 to de-energize the same.

The stair assembly 38 is shown in FIGURE 1 in a down and extended position. The two side beams 152 are cantilevered from the cam followers 140 which engage the cam tracks 142 in the side plates 106 and 108 as illustrated in FIGURES 5, 6, 7 and 8. The cam tracks 142 produce a horizontal translation motion to the stair assembly 38 as the carriage assembly 36 is moved outwardly from its position indicated in FIGURE 2. It can be seen from FIGURE 5 that the cam follower 140 follows the downwardly curved lower end 172 of the cam track 142. This produces a rotational motion with some further horizontal translation motion of the stair assembly 38 as it is lowered to the ground position shown in FIGURE 1.

The cam followers 168 (FIGURES 5 and 8) of the handrail posts 158 follow the upwardly curved upper end 170 of the cam tracks 142 such that as the stair assembly 38 rotates to contact the ground, the handrail posts 158 are erected to a perpendicular position with respect to the stair assembly 38. When the posts 158 are erected, the outer posts 274 are also erected by the upper tubular handrails 276 connecting the inner posts 158 to the outer posts 274 which are pivotably connected to the side beams 152 by pins 278 as shown in FIGURE 1. The upper handrails 276 are also pivotably connected to the inner posts 158 by pins 280 and to the outer posts 274 by pins 282. The lower end of each of the posts 274 is connected by a tube 284 to a corresponding bracket 286 which is pivotably attached to a side beam 152 by pin 288. Each bracket 286 rotatably mounts a ground roller 290 which can be adjusted in position by an adjusting clevis 292 connecting with the end of the tube 284.

A post 158 and a post 274 on the same side of the stair assembly 38 are used to support a lower tubular handrail 294 for each of the handrail assemblies 40 and 42 as shown in FIGURE 1. The upper handrails 276 each has an extendable and retractable telescoping inner tube 296 which is electrically driven normally by a linear actuator 298. The extended tube 296 forms a smooth and continuous handrail from the bottom step of the stair assembly 38 to within the cabin doorway 300. The cabin door 302 must be opened and latched by a hold-open hook 304 before the tubes 296 can be electrically extended. This will prevent the tubes 296 from being driven against the cabin door 302. A safety cable 306 connects the end of each of the tubes 296 to a point within each of the lower handrails 294.

FIGURE 13 is a simplified elevational view which shows only the handrail assembly 40 in a folded condition within the housing 34. It may be seen from this view that the lower handrail 294 includes an outer tube 308 and a shorter inner tube 310 which telescopes into the right end of the outer tube 308 when the stair assembly 38 is in a down position with the handrail assembly 40 raised. The tube 308 is pivotably pinned to the post 158 by pivot pin 312 which rotatably mounts an internal pulley wheel within the joint. The post 158 also rotatably mounts another internal pulley wheel 314 and the safety cable 306 from the end of the telescoping inner tube 296 of the upper handrail 276 is passed around the pulley wheel 314 and the one mounted on pivot pin 312 to connect with one end of a long tension spring coil 316, the other end of which is connected to pivot pin 318 rotatably securing the end of the inner tube 310 to the outer post 274.

FIGURE 14 is a perspective view showing the linear actuator 298 for extending and retracting the telescoping inner tube 296 of the upper handrail 276. Motor 320 has an armature which is braked by a spring-loaded brake when the motor 320 is not energized. The brake is energized and released when the motor 320 is energized to drive its output pinion gear 322. The pinion gear 322 is beveled and meshes with a beveled ring gear 324 which is spring-loaded to engage the pinion gear 322. The hollow shaft 326 of the ring gear 324 is, for example, pin-coupled to gear 328 which is rotatably mounted on shaft 326 and drives output gear 330. The gear 328 is suitably fixed axially in place. When manual release lever 332 is pressed upwards, gear 334 rotates gear 336 and its shaft. By a suitable internal cam pin (not shown) on the shaft of gear 336, which cam pin engages an inclined slot on a concentric movable sleeve that is connected to the shaft 326 to cause axial movement thereof, axial disengagement of the ring gear 324 from pinion gear 322 and decoupling of shaft 326 from the gear 328 are effected when gear 336 is rotated by the lever 332. Other forms of standard release mechanism and clutch means can, of course, be used to disconnect a selected gear from the drive system.

The output gear 330 engages a retract gear and drum assembly 338 which, in turn, engages an extend gear and drum assembly 340. Wrapped around the extend drum assembly 340 is an extend drive tape 342, the end of which is anchored to an anchor drum 344 attached to the inner end of the telescoping inner tube 296. Similarly, a retract drive tape 346 is wrapped around the retract drum assembly 338 and the end of the tape 346 is looped about an idler wheel 348 which is attached to the end of the outer tubular handrail 276, to be anchored to the anchor drum 344 as shown in FIGURE 14. The extend drum assembly 340 takes up the extend drive tape 342 to extend the inner tube 296 while the retract drum assembly 338 pays out the retract drive tape 346. The reverse action occurs, of course, when the inner tube 296 is retracted.

An extend limit switch 350 is actuated by an extend arm 352 attached near the inner end of the inner tube 296, and a retract limit switch 354 is actuated by a retract arm 356 located near the outer end of the inner tube 296. The retract limit switch 354 is actually controlled by a spring-loaded cylinder 358 mounted on a rod 360 as illustrated in FIGURE 14. A lockout limit switch 362 is operated by a spring-loaded rod 364 which is actuated only when the post 158 of the corresponding handrail assemblies 40 and 42 has been erected. This will be apparent from the drawing of FIGURE 13.

FIGURE 15 is a perspective view of the inside structure of the stairwell door 64 shown in its open position. A ledge 366 runs around the stairwell door 64 and serves as a seal depressor when the door 64 is closed. Control cable 192 connects with the door 64 and leads from cable guide 368 into channel 190 of a gear rack 80 (FIGURE 5). A deflector bracket 370 is provided on the door 64 to contact the corresponding roller 290 (FIGURES 1 and 13) at the end of the stair assembly 38 when the carriage assembly 36 is driven outwardly to lower the stairway assembly 32. There are also four clevis devices 372 having cross pins 374 through the ends of two, and a latch mechanism release rod 376 extending between and passing through the ends of the other two.

FIGURE 16 is a fragmentary perspective view of the cabin doorway 300 and stairwell doorway 62 showing certain control elements for the aircraft stairway assembly 32. The attendant's or interior control panel 378 is located beyond the doorway 300 and the interior stairwell door latch control hanadle 380 is located near the control panel 378. This handle 380 performs the same function as the exterior stairwell door latch control handle 382 shown in FIGURE 1. Both of the control handles 380 and 382 are connected by suitable linkages to the stairwell door latch mechanism torque tube 384. The torque tube 384 is, of course, suitably mounted to aircraft structure so as to be substantially parallel to the upper edge of the stairwell doorway 62.

A mechanical interlock pin 386 (FIGURE 16) in the cabin doorway 300 is also suitably linked to the torque tube 384 so that it is withdrawn from within the catch housing 388 when the torque tube 384 is in the stairwell door latched position. This then permits the interlock arm 390 to pivot into the hood shaped catch housing 388. The interlock arm 390 is mechanically connected to the cabin door latch so that for flight safety, the interlock pin 386 within the housing 388 will not allow the cabin door 302 to be latched until the stairway assembly 32 is retracted and up, and the stairwell door 64 securely latched, which withdraws the pin 386 from the housing 388 and allows the arm 390 to enter it.

Located inside of the stairwell doorway 62 is a limit switch 392 which is operated by the stairwell door 64 in its closed position. The limit switch 392 is suitably engaged by upper edge structure of the stairwell door 64 shown in FIGURE 15 when the door 64 is closed. A safety lockpin switch 394 located generally as indicated in FIGURE 16, is actuated by the end of a lockpin (not shown) to remove control power from the stairs and carriage actuator assembly 124 (FIGURE 5). When the stairway assembly 32 has been lowered, the lockpin can be passed through a fitting 396 affixed to the inboard edge of carriage platform 110 to engage aircraft structure mounting the lockpin switch 394. This locks the carriage assembly 36 in place and also removes the control power to it.

Control power to the carriage assembly 36 can also be removed by operating the power switch 398 shown in FIGURE 1 to its off position. When power is removed from the carriage assembly 36, the clutch solenoid 258 (FIGURE 12) is de-energized to permit manual operation of the stairway assembly 32 when the lockpin has been removed from the fitting 396 (FIGURE 5) to unlock the carriage assembly 36 from aircraft structure. Two other switches 400 and 402 are indicated in FIGURE 16 and these switches 400 and 402 are positioned to be actuated by suitable arms on the torque tube 384 when it is in its stairwell door unlatched position. The switch 400 controls power to the stair lamps 156 (FIGURE 1) and the switch 402 controls control power to the stairway assembly 32. When the stairwell door 64 is open, the limit switch 392 also provides control power to the stairway assembly 32.

FIGURE 17 shows a stairwell door latch mechanism 404 mounted to the torque tube 384 wherein the latch hook 406 has engaged its corresponding cross pin 374 (FIGURE 15) of a clevis device 372 to close the stairwell door 64. There are, of course, four latch mechanisms 404 mounted to the torque tube 384 at positions corresponding to the clevis devices 372. Lever arm 408 connecting with the torque tube 384 is connected through suitable linkages to the interior and exterior control handles 380 and 382 (FIGURES 1 and 16). When the lever arm 408 is rotated in the direction of arrow 410, the latch hook 406 is disengaged from cross pin 374 to unlatch the stairwell door 64.

Each latch mechanism 404 includes a latch bracket 412 which is fastened to aircraft structure bracket 414 by bolts 416. The bracket 412 is supported on the torque tube 384 on one end and the other end has an open cam portion 418 as illustrated in FIGURE 17. A crank 420 is affixed on one end to the torque tube 384 and is connected at the other end to one end of a latch operating lever 422. The other end of the lever 422 is bracketed by an end 424 of latch hook 406 and secured thereto by bolt 426. This connection is such as to hold the lever 422 and hook 406 in fixed positions with respect to each other.

Cam follower 428 is rotatably attached to the elbow of the hook 406 and engages the cam portion 418 of the latch bracket 412. A guide pin 430 is affixed to the free end of the hook 406 and engages an arcuate slot 432 in the structure bracket 414. The operating contours of the cam portion 418 and slot 432 can be as shown in FIGURE 17. When the crank 420 is rotated by the torque tube 384 to the position indicated in broken lines, the hook 406 releases the cross pin 374 to unlatch the stairwell door 64. When the stairwell door 64 is latched, the lever 422 is moved to an over center position and the cam follower 428 is also moved to an over center position. The load is carried by the latch bracket 412 with the cam follower 428 engaging the cam portion 418. However, if the bracket 412 should fail, the load can be carried by the operating lever 422.

FIGURE 18 shows a hold-open hook 434 rotatably mounted on a shaft 436 which is affixed to aircraft structure. The hook 434 is spring-loaded by a spring 438 towards the down position indicated in phantom lines. A crank 440 is secured to the torque tube 384. The crank 440 is shown in the stairwell door 64 latched condition. In this condition, the latch mechanism release rod 376 (FIGURE 15) forces and holds the hook 434 in the position shown in solid lines in FIGURE 18, against the bias of the spring 438. It is noted that the hook 434 is preferably fabricated from two parts which can be adjustably secured together as required to adjust clearances between the crank 440 and the hook 434.

When either of the control handles 380 or 382 (FIGURES 1 and 16) are moved to the stairwell door open position, the torque tube 384 (FIGURE 17) is operated to unlatch the stairwell door 64. Simultaneously with the unlatching of the stairwell door 64, the crank 440 shown in FIGURE 18 is rotated in the direction of arrow 442 and the hook 434 is released by the rod 376 to be moved downwardly by spring 438, engaging the crank 440 in the position indicated in phantom lines to hold the control handles 380 and 382 in their stairwell door open positions. This prevents the latch mechanism 404 (FIGURE 17) from being placed in the latched condition with the stairwell door 64 open.

FIGURES 19A through 19D diagrammatically depict the progressive lowering and extension of the aircraft stairway assembly 32. Generally, to accomplish this, the cabin door 302 (FIGURE 1) is unlatched and secured to hold-open hook 304. The cabin door handle operates a hold-open switch 444 when it engages the hook 304. Of course, when the cabin door 302 was unlatched, door switch 464 is operated and the interlock arm 390 (FIGURE 16) was withdrawn from the catch housing 388 which then permits the control handles 380 or 382 (FIGURES 1 and 16) to be operated to unlatch the stairwell door 64 and be placed in the hold-open condition (FIGURES 17 and 18). The stair assembly 32 can then be electrically operated by the exterior push button switches 446 and 448 (FIGURE 1) on exterior control panel 450 or control switches on the interior control panel 378 (FIGURE 16).

FIGURE 20 is a circuit diagram for the aircraft stairway assembly 32. It is believed that an operative description of the stairway assembly 32 with continuous reference to the circuit diagram, generally following the illustrations of FIGURES 19A through 19D and periodically to the various other figures, will serve to integrate the various stairway parts into a clearly cooperative system. Generally, it can be seen that certain elements have been grouped together in FIGURE 20 under forward attendant's or, exterior control panel 378, interior control panel 450, handrails actuator assembly 452, and stairs and carriage actuator assembly 124.

Power for the stairway assembly 32 in normally provided through circuit breakers from a transfer bus 454 which is suitably connected to aircraft or ground power. Power can also be obtained through circuit breakers directly from battery bus 456 by operating the power switch 398 of exterior control panel 450 to the battery position. This energizes the carriage power relay 458 and the handrails power relay 460 so that the relay poles are connected to their respective contacts which connect with the battery circuit breakers. The stair lamps 156 are, however, supplied by alternating current power through circuit breaker 462. It is to be noted that the power switch 398 (FIGURE 1) preferably has a guard which returns the switch 398 to its normal position whenever the exterior control handle 382 is closed. The battery position of the switch 398 is also preferably a momentary contact position as indicated in FIGURE 20.

When the cabin door 302 (FIGURE 1) is unlatched, the switch 464 is closed so that annunciator lamp 466 (FIGURE 20) lights in the cockpit. Securing of the cabin door 302 to its hold-open hook 304 actuates the hold-open switch 444 from its unlatched position to its latched position. By operating the control handles 380 or 382 (FIGURES 1 and 16), the stairwell door 64 is unlatched to close the circuits of both poles of the switch 400 and the pole of the switch 402. At the same time, both poles of the limit switch 392 are actuated to close their respective circuits.

When the stairwell door 64 is either open or unlatched, as sensed by the switches 392 and 400, the annunciator lamp 468 lights in the cockpit and the indicator lamp 470 lights on the interior control panel 378. The switch 400 also applies alternating current power through the circuit of the other pole to auto-transformer 472 which provides a suitably reduced voltage to the platform and step lamps 156. The lamps 156 may, of course, be energized at any time by the manually operated lights switch 474.

When the stairwell door 64 is unlatched or open, power from the transfer bus 454 is connected by the lower pole of relay 458 through switches 402 or 392 to the power switch 398 and the cabin door hold-open switch 444. The closed lockpin switch 394 connects power from switch 398 to the clutch solenoid 258, the stair up and down control switches 446 and 448 of the exterior control panel 450, and stair control switch 476 on the interior control panel 378. This power is also supplied to stair down indicator lamp 478 on the interior control panel 378 when both of the handrail telescoping tubes 296 (FIGURE 14) have been fully extended to actuate the extend limit switches 350.

It may be noted that power is supplied to the power switch 398 by the limit switch 392 when the stairwell door 64 is open. This is a safety feature since the carriage assembly 36 and stair assembly 38 can be easily moved manually when the clutch solenoid 258 is deenergized. During flight, for example, if for any reason the stairwell door 64 is broken open, the stairway assembly 32 might extend out the stairwell doorway 62 in the absence of the switch 392 since the stairwell door latch switch 402 will remain in its latched condition even though the stairwell door 64 is open. The switch 402 thus would not apply power through switches 398 and 394 to energize the clutch solenoid 258 in such event. However, the limit switch 392 would then apply power to the solenoid 258 and lock the carriage assembly 36 and stair assembly 38 in place within the aircraft.

To lower the stairway assembly 32, the switch 476 on the interior control panel 378 or the switch 448 of the exterior control panel 450 can be operated to the stair down position. This applies power to the down coil 478 of the stair carriage relay 480. The poles of the relay 480 are deflected downward from their center positions and power is applied to the motors 126 and 128 through their respective down limit switches 266 and 268 from the two upper poles of the relay 458. When the stairway assembly 32 is fully lowered, the rocker arm 364 (FIGURE 12) of the control mechanism 256 is rocked to open the limit switches 266 and 268 to deenergize the motors 126 and 128.

The handrail assemblies 40 and 42 are, of course, erected although the telescoping tubes 296 are still retracted. The lockout limit switches 362 are now closed by the erected inboard posts 158 actuating the rods 364 (FIGURE 14). In order to extend the telescoping tubes 296, the cabin door hold open switch 444 must be in its latched condition and the handrail control switch 482 on the interior control panel 378 must be operated to the up or extend position. This energizes the extend coil 484 of the handrail control relay 486 to deflect its poles to the up position. This applies power to the handrail motors 320 until the tubes 296 are fully extended at which condition the extend arms 352 actuate the extend limit switches 350. Extension of the tubes 296 releases the cylinder actuator 358 (FIGURE 14) and permits the poles of retract limit switches 354 to move from their interlock terminals to their retract terminals. Opening of the interlock terminals of either of the retract limit switches 354 prevents power from reaching the up coil 488 of stair carriage relay 480 and raising the stairway assembly 32 so long as the telescoping tubes 296 are extended.

It is noted that when the cabin door hold-open switch 444 is in its unlatched position, power will be applied to the retract coil 490 of the handrail control relay 486 to retract the telescoping tubes 296 when switches 392 and/or 402 are closed. As was mentioned previously, the purpose of this was to prevent the tubes 296 from being inadvertently driven into the cabin door 302 (FIGURE 1) when it is not fully opened. Of course, it is possible to delete the hold-open switch 444, if desired, and the wire connecting with the pole of the switch 444 can be connected directly to the pole of the handrail control switch 482. The advantage of this is that the tubes 296 will not be unexpectedly retracted should the cabin door 302 be released from its hold-open hook 304. Alternatively, the pole of the hold-open switch 444 can be connected to the output contact of the lockpin switch 394 instead of the pole of the power switch 398 as shown.

After the stairway assembly 32 has been fully lowered and extended, the safety lockpin may be placed into the fitting 396 (FIGURE 5) on the platform 110 of the carriage assembly 36 to secure the carriage assembly 36 in place and open the lockpin switch 394 which removes power from the clutch solenoid 258 and the stair control switches 476, 446 and 448. Power is also removed from the stair down indicator lamp 478. The safety lockpin is not used for normal, short duration stops. Its use is, however, desirable where all power, including the battery, is removed from the airplane or that an extended stop is made and it is not desired to have the clutch solenoid 258 energized all this time. Manual operation of the stairway assembly 32 is, of course, performed with the power switch 398 in its off position and the lockpin removed from its fitting 396. For powered operation, the power switch 398 is placed usually in its normal position, except for direct battery operation, and the lockpin removed from its fitting 396.

To retract and raise the stairway assembly 32, the stair control switch 476 on the interior control panel 378 or the stair up switch 446 of the exterior control panel 450 may be actuated to their stair up positions. When this is done, power is applied to the retract coil 490 of the handrail control relay 486 which deflects its poles to their lower contacts. This applies power from the two poles of handrails relay 460 to the handrail motors 320 to retract the telescoping tubes 296. The extend arms 352 (FIGURE 14) then releases the extend limit switches 350 to their original conditions. When the tubes 296 are fully retracted, the retract limit switches 354 are actuated by the retract arm 356 so that the interlock contacts are closed as shown in FIGURE 20. This then permits power to be applied to the up coil 488 of the stair carriage relay 480.

When the up coil 488 is energized, power is applied to the carriage motors 126 and 128 through their respective up limit switches 270 and 272. This, of course, raises the stair assembly 38 and withdraws it and the carriage assembly 36 into the stairway housing 34. When the handrail assemblies 40 and 42 are folded, the lockout limit switches 362 are opened to prevent power from being applied to the handrail motors 320. The end of the side plate 108 (FIGURE 5) engages the slider 186 attached to the end of cable 192 and pulls the stairwell door 64 closed. At that time, the limit switch 392 is actuated to its stairwell door closed position and the release rod 376 on the stairwell door 64 engages the end of the hold-open hook 434 (FIGURE 18) forcing it to rotate against the bias of the spring 438 and permit the crank 440 to be rotated by the torque tube 384. When the carriage assembly 36 is drawn fully into the housing 34 against the pedestals 184 (FIGURE 2), the rocker arm 264 (FIGURE 12) is pivoted to actuate and open the limit switches 270 and 272. This, of course, de-energizes the carriage motors 126 and 128.

By operating either of the mechanically linked control handles 380 or 382 (FIGURES 1 and 16) to its closed position, the torque tube 384 (FIGURE 17) is rotated to cause the latch mechanisms 404 to engage their respective catches of the clevis devices 372 on the stairwell door 64 and latch the same. When this is done, the latch switches 400 and 402 (FIGURE 16) are operated to their latched positions which removes power from the stair lamps 156, the indicator lamps 468 and 470, and from the poles of the power switch 398 and cabin door hold-open switch 444. By releasing the cabin door 302 from its hold-open hook 304 (FIGURE 1), the switch 444 pole assumes its unlatched position and when the cabin door 302 is closed and latched, the annunciator lamp 466 is de-energized. The stairway assembly 32 is thus placed in condition ready for flight.

While a particular embodiment of my invention has been described above and shown in the drawings, it is to be understood that the particular embodiment is merely illustrative of, and not restrictive on, my broad invention and that various changes in design, structure and arrangement may be made without departing from the spirit and scope of the appended claims.

I claim:
1. A stairway assembly comprising:
   track means provided on relatively fixed structure;
   carriage means movable on said track means normally between a first position and a second position thereon;
   a stair assembly; and
   means connecting said stair assembly to said carriage means, said connecting means simultaneously moving the connection of said stair assembly to said carriage means between a first position and a second position in said carriage means correspondingly with the movement of said carriage means between its first and second positions on said track means.

2. Apparatus as defined in claim 1 wherein said relatively fixed structure is that of a mobile craft, and said track means, carriage means and stair assembly are normally provided within a removable stairwell housing mounted in said mobile craft.

3. Apparatus as defined in claim 1 wherein said carriage means includes first cam means cooperatively engaging the connection to said stair assembly for rotating said stair assembly between a generally horizontal position and an angular position when the connection to said stair assembly is near its second position in said carriage means.

4. Apparatus as defined in claim 3 including a pair of power drive devices, differential means coupled to said drive devices for driving said carriage means between its first and second positions on said track means and permitting reduced speed powered operation in the event one of said drive devices is disabled, and clutch means for allowing manual operation of said carriage means between its first and second positions on said track means, said clutch means being energizable to connect said differential means to said carriage means and permit powered operation thereof.

5. Apparatus as defined in claim 3 wherein said stair assembly includes a foldable handrail having a cam follower engageable to operate said handrail between a folded condition and an erected condition when the connection to said stair assembly is near its second position in said carriage means, and said carriage means includes second cam means cooperatively engaging said cam follower for actuating the same and operate said handrail when the connection to said stair assembly is near its second position in said carriage means, said handrail being fully erected when the connection to said stair assembly is at its second position in said carriage means.

6. Apparatus as defined in claim 5 wherein said handrail includes a telescoping inner tube which can be extended and retracted when said handrail is placed in the erected condition, and extend tape and a retract tape conected to said inner tube, and means for taking up said retract tape is being played out and conversely taking up said retract tape to retract said inner tube simultaneously as said extend tape is being played out.

7. Apparatus as defined in claim 6 including means for electrically driving said extend and retract tapes selectively in either direction for extending and retracting said inner tube, and clutch means normally connecting said electrical drive means to said extend and retract tapes, said clutch means being manually operable to disconnect said electrical drive means from said extend and retract tapes to allow manual extension and retraction of said inner tube.

8. A stairway assembly comprising:
   track means provided within a stairwell in relatively fixed structure, said structure mounting a stairwell door for closing said stairwell;
   carriage means adapted to be driven on said track means between a first position and a second position thereon;
   a stair assembly adapted to be connected to and moved by said carriage means, said stair assembly being placed in a first condition when said carriage means is at the first position on said track means and in a second condition when said carriage means is at the second position on said track means; and
   means responsive to movement of said carriage means for closing said stairwell door when said carriage means is moved to the first position on said track means.

9. Apparatus as defined in claim 8 including means for latching said stairwell door when the same is closed, and means for preventing operation of said latching means when said stairwell door is opened.

References Cited

UNITED STATES PATENTS

| | | | |
|---|---|---|---|
| 2,990,148 | 6/1961 | James | 182—88 |
| 3,008,533 | 11/1961 | Haberle | 182—88 |
| 3,083,784 | 4/1963 | Urian | 182—88 |

RENALDO P. MACHADO, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,749

October 1, 1968

Robert A. Warren

It is certified that error appears in the above identified patent and that said Letters Patent are hereby corrected as shown below:

Column 3, line 38, "upon" should read -- up --. Column 10, line 72, "or, exterior control panel 378, interior" should read -- or interior control panel 378, exterior --; line 75, "in" should read -- is --. Column 11, line 75, "364" should read -- 264 --. Column 14, line 27, "and", first occurrence, should read -- an --; line 28, "conected" should read -- connected --; line 29, before "retract" insert -- extend tape to extend said inner tube simultaneously as said --.

Signed and sealed this 7th day of April 1970.

(SEAL)
Attest:

Edward M. Fletcher, Jr.

Attesting Officer

WILLIAM E. SCHUYLER, JR.

Commissioner of Patents